May 24, 1955 W. E. MARSHALL 2,709,131
METHOD OF PRODUCING CONCENTRATES OF IRON AND
MANGANESE FROM LOW-GRADE ORES AND SLAGS
Filed June 24, 1949
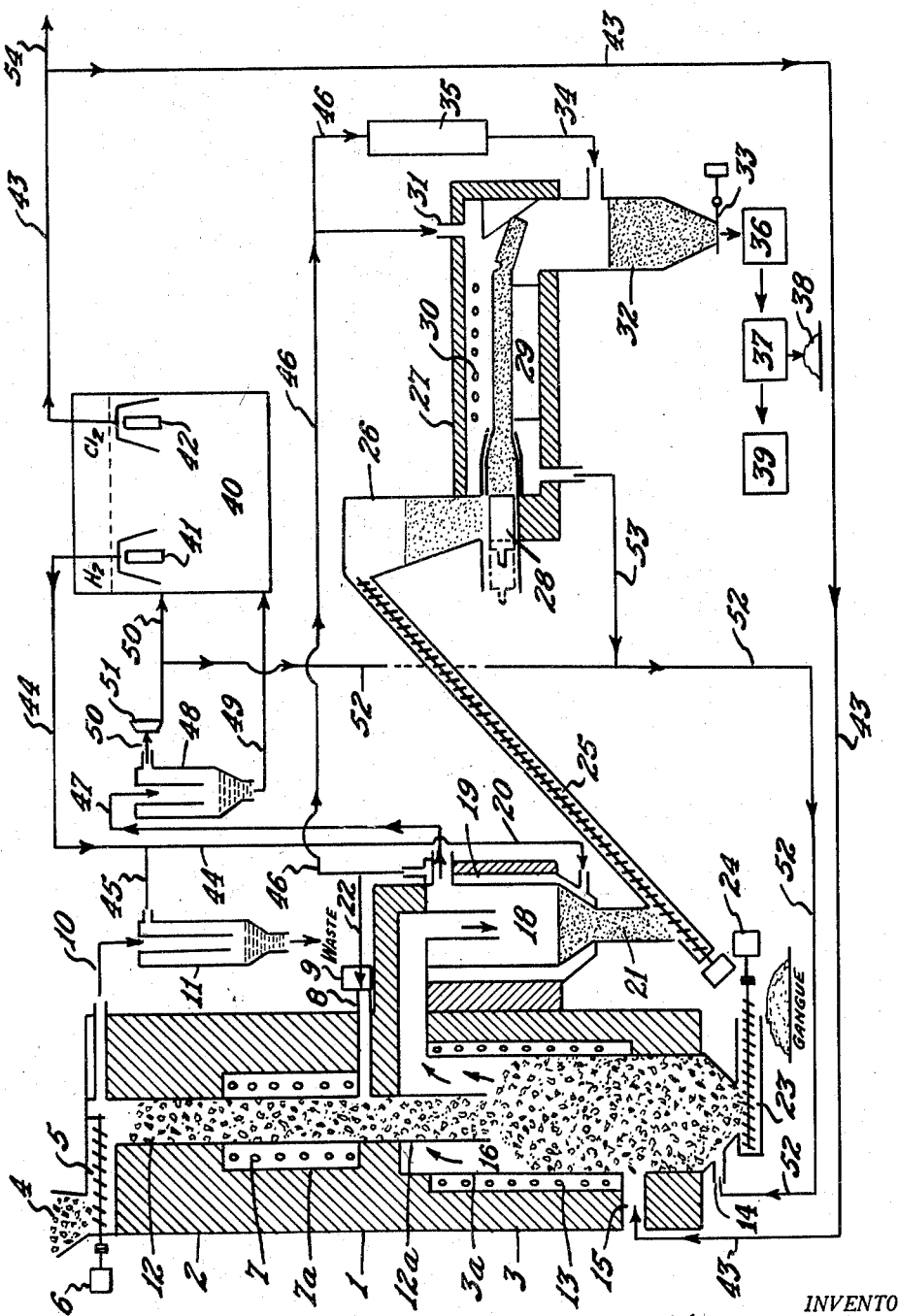
INVENTOR.
WILLIAM E. MARSHALL,
BY Allen & Allen
ATTORNEYS

United States Patent Office 2,709,131
Patented May 24, 1955

2,709,131

METHOD OF PRODUCING CONCENTRATES OF IRON AND MANGANESE FROM LOW-GRADE ORES AND SLAGS

William E. Marshall, Middletown, Ohio, assignor to Armco Steel Corporation, Middletown, Ohio, a corporation of Ohio Application June 24, 1949, Serial No. 101,216

17 Claims. (Cl. 75—21)

The principal object of this invention is the provision of an economical process for the production of iron in powdered form and manganese concentrate or metallic manganese suitable for use in the manufacture of steel. These materials are produced in accordance with my process either from ores or from open hearth furnace slags or other metallurgical slags containing manganese.

While in the operation of the blast furnace the manganese contained in the iron ore forms a part of the pig metal, it is well known that in subsequent operations, such as the refining of blast furnace metal in the open hearth and in Bessemer converters and the like, the manganese is oxidized and is lost in the slag. It has been estimated that there is enough manganese in the currently produced slags in these operations to supply the entire current needs of the steel industry for manganese in ferro alloys. Where manganese is required in a ferro-alloy, it is current practice to add it in the form of ferro-manganese in the ladle after the metal has been refined and before the formation of ingots. In view of the shortage of high-grade manganese ores in this country, it is one of the objects of this invention to provide a mode of recovering manganese either from low-grade ores or from slags containing it, or mixtures of the two.

It is an object of this invention to provide a process of producing pure iron in powdered form, and either a manganese concentrate or metallic manganese, either product having a commercial value which under normal circumstances and depending upon particular market conditions will carry the cost of the process, in large part if not in whole.

It is an object of the invention to provide a process in which the iron and manganese can readily be separated and in which both can be recovered without undue contamination with other materials.

It is an object of the invention to provide a self-contained process in which the essential reagents are recovered and regenerated to increase the economy of the operation.

It is a further object of the invention to provide a process in which waste products are at a minimum, particularly those which would involve a disposal problem.

It is an object of the invention to provide a process in which corrosive influences are minimized and in which therefore the cost of equipment is held at a low level.

These and other objects of the invention which will be set forth hereinafter or will be apparent to one skilled in the art upon reading these specifications, are accomplished by that procedure, in the use of that apparatus, and in the techniques hereinafter set forth, of which I shall now describe an exemplary embodiment.

Reference is made to the accompanying drawing which is a flowsheet of diagrammatic character of the apparatus which I may employ.

Briefly, in the practice of my invention, I treat a dry slag or ore containing both iron oxides and manganese oxides with hydrogen to remove as much oxygen as is possible. Thereafter, and preferably as part of a continuous treating step, I treat the partially processed ore or slag with hydrogen chloride gas containing an excess of hydrogen. This converts the contained iron and manganese to the ferrous and manganous chlorides, which have the important advantage that they are easy to handle, are not substantially corrosive, are not hygroscopic and do not react rapidly either with moisture or oxygen in the air, which properties are to be distinguished from the opposite properties of ferric chloride.

The treatment of the metals with the mixture of hydrogen chloride gas and hydrogen is carried on at an elevated temperature and involves an exothermic reaction. As a consequence the ferrous and manganous chlorides which are formed vaporize and are carried over into a condenser where they solidify. The next step in my process is the subjecting of the mixture of ferrous and manganous chlorides to special reducing conditions wherein the ferrous chloride is reduced to the metal but the manganous chloride forms an oxide as hereinatfer more fully explained. This gives me a material readily subject to magnetic separation, after such crushing as may be desired. The iron powder which is recovered in this way is in a high state of purity, while the manganous oxide is capable of being smelted readily for the formation of metallic manganese or high-grade ferro-manganese.

Referring now to the drawing, I have indicated a treatment furnace generally at 1. This furnace is made in two parts indicated at 2 and 3, which will hereinafter be more fully described. The initial part of the furnace (which is preferably in the form of a vertical shaft) is fed with the slag or ore or mixture thereof from a hopper 4 by means of a screw 5 driven by a motor 6 or other suitable means. It will be understood that other feeding means may be employed as found expedient; and a reasonable sealing off of the gases in the furnace is desired at the feeding point. It may be pointed out however that a positive pressure is preferably maintained in the furnace so that some slight outward bleeding of the gases is not disadvantageous and is preferably maintained.

The upper part of the furnace may be provided with heating means 7. In the upper part of the furnace the ore or slag is treated by means of hydrogen to effect the reduction aforesaid. The hydrogen is introduced into the upper part of the shaft through a conduit 8, as by means of a pump 9, and the gases from the upper part of the furnace exit through a conduit 10. The exit gases contain a certain quantity of hydrogen; but the reduction reaction in the upper part of the furnace will have formed substantial quantities of water, which comes out of the furnace in the form of steam. As a consequence, I pass the furnace exit gases into a condenser 11 where the steam is condensed to water, the hydrogen remaining as a gas and being recovered in the system as hereinafter explained. The water condensed in the condenser 11 does not contain any deleterious by-products and hence is suitable for disposal in sewers or streams.

The upper portion of the furnace may be operated over a wide range of temperatures. The reduction of iron oxides, and the reduction of any higher manganese oxides which may be present to the lower oxides will occur at temperatures as low as 700° F., although slowly. In general, as the temperature rises, the reduction reactions become more rapid. The upper limit of temperature is usually marked by that degree of heat which produces sintering of the ingredients and affects their travel through the furnace, and will be as high as 2000° F. for some materials. My preference is for operations in the neighborhood of 1500° F. or, say, between 1500° and 1600° F.

Since there are no corrosive influences in the upper part of the furnace shaft, and since it operates under reducing conditions, it may be lined with a simple iron tube 12, although refractories or other material may be employed if desired. The heating means 7 may be any desired. I have illustrated heating means in the form of electrical resistance elements in a jacket 7a surrounding the tube 12 and contained within the insulative refractory body of the furnace part 2. There is an extension 12a of the tubular element downwardly into the second part 3 of the furnace for a purpose hereinafter described. Since this extension is subject to the hydrogen chloride gas in the lower part of the furnace, it may be made of nickel or refractories, or of other metals which will not be affected by the influences hereinafter discussed. It may be pointed out that it is not necessary to reduce the oxides of manganese to the metal in the upper part of the furnace and ordinarily such reduction does not take place. Rather the oxides of iron are reduced to the metal, and the oxides of manganese are reduced to the manganous form.

The lower part of the furnace 3 is that portion in which the iron and lower manganese oxides will be converted by a mixture of hydrogen and hydrogen chloride gas. It is possible to introduce into the lower furnace portion a preformed mixture of hydrogen and hydrogen chloride gas in the required proportions. Since, however, chlorine will be generated in a phase of my process hereinafter to be described, I prefer to introduce into the lower part of the furnace hydrogen chloride gas recirculated as hereinafter described, plus hydrogen, and chlorine which will immediately combine with the hydrogen by burning, there being a substantial excess of free hydrogen over the chlorine. The active reagents in the reaction occuring in the lower part of the furnace are thus hydrogen chloride gas and hydrogen, there being no free chlorine. It is possible to vary substantially the relative quantities of hydrogen and hydrogen chloride gas for the production from iron and manganous oxide of the ferrous chloride and manganous chloride from substantially 100% hydrogen chloride to a ratio of hydrogen to hydrogen chloride so high that the formation of the metallic chlorides will be unduly slow through the approach of equilibrium and the diluent effect of the hydrogen. This makes it possible to choose for the lining 3a of the lower part of the furnace, and for the tubular extension 12a, various metals which will not be affected by particular ratios of these gases effective in the conversion noted above. Nickel is one such metal, and may be employed with advantage where the ratio of hydrogen to hydrogen chloride gas is greater than substantially 1:1. A refractory lining may of course be employed if desired. A metallic lining permits the transmission of heat more readily; and it will be noted that in the lower part of the furnace I provide heating means indicated at 13. As above, the heating means may be electrical heating elements surrounding the lining 3a of the furnace portion 3. The shaded portion of the furnace indicates an insulative casing.

In the particular embodiment, an initial mixture of hydrogen and hydrochloric acid gas is introduced through a conduit 14, and the chlorine in lesser amount than the hydrogen is introduced through a conduit 15. The lower portion 3 of the furnace is preferably operated at temperatures lying substantially between 1600 and 1900° F. The evolution of the chlorides begins to be effective at about 1600° F. and becomes quite rapid at 1800° F. although the reaction can be carried out at a much higher temperature limited only by the heat-resisting ability of the materials of which the furnace is constructed and the temperature at which the charge sinters and fails to move through the furnace.

The formed chlorides vaporize and the vapors pass into a collection space 16 above the mass of ore or slag in the lower part of the furnace. The vapors of these substances pass laterally from the lower furnace shaft through a conduit 17 and into a condenser 18. This condenser has a jacket 19 through which the incoming hydrogen for the upper part of the furnace is introduced as through a conduit 20. This results in the cooling of the condenser 18 and the condensation of the ferrous and manganous chlorides which collect at the bottom of it as at 21. It also preheats the hydrogen which leaves the jacket through a conduit 22 connected with the pump 9.

The ore or slag from which the iron and manganese have been removed in the form of chlorides passes from the bottom of the furnace through a screw 23 operated by a motor 24. It will hereinafter be referred to as gangue and is a waste product. The preceding phase of this process has utility as a means of producing a mixture of ferrous chloride and manganous chloride, which might be separated by various chemical means. I prefer, however, to subject these products to further steps of this process now to be described which can be integrated advantageously with the foregoing steps, since the gaseous reagents and by-products are the same and fit into the self-contained recirculation and regeneration system to be described hereinafter.

In these further steps of my process I subject the mixture of ferrous and manganous chlorides to a reduction operation. This may be accomplished in a furnace directly connected to the condenser 18 to receive the chlorides therefrom; and this furnace may be of the vertical shaft type if desired. However, for purposes of illustration, I have shown the materials carried by a screw conveyor 25 from the condenser 18 to the hopper 26 of a horizontal furnace 27. This furnace is preferably provided with a plunger feeder 28 and a hearth 29 on which the materials are treated. Heating elements 30 are provided in the furnace.

Hydrogen is introduced into the furnace 27 through a conduit 31. The operating temperature of furnace 27 lies between a lower temperature at which the rate of reduction is unduly slow and an upper temperature beyond which sintering of the iron powder becomes so marked that the product no longer can be broken or ground up into a fine powder suitable for the separation of its components. In my experience this temperature range has been found to lie substantially between 700° F. and 1600° F., with 1100° to 1300° F. being preferred, the lower end of this preferred range and below requiring no crushing.

It is an advantage of my process that the hydrogen so introduced does not require to be thoroughly dried. This advantage arises from the fact that the products produced in the furnace 27 are iron and manganous oxide. As a consequence the atmosphere of the furnace need only be maintained reducing toward iron, but need not be reducing toward manganese. The amount of water vapor which can be present in hydrogen at the temperature of furnace 27 can be relatively high without forming iron oxide, as can be readily calculated from well-known equilibrium data relating hydrogen, water, iron, and iron oxide. For example, at 1100° F. there can be up to approximately 24% water vapor in the hydrogen without oxidizing iron. On the other hand, manganese is so readily oxidized by water vapor that with the hydrogen gas dried as well as commercially possible, manganese, if present, would tend to be converted to manganese oxide.

The treated material collects in a hopper 32 from which it may be withdrawn by means of any suitable gate apparatus 33. It will be found advantageous to introduce into the collection hopper 32 some drier hydrogen through a conduit 34, and this hydrogen may first be passed through a dryer 35. This drier hydrogen protects the iron from reoxidation while cooling.

The material from the gate 33 passes to a crusher 36 and thence to a magnetic separator 37 from which I recover powdered iron in a high state of purity as at 38, and manganous oxide, also in a high state of purity, which may either be shipped and stored as such or may be passed to a smelter 39 for the production of the metal or of ferro-manganese.

The requirements for hydrogen in the process are preferably satisfied by an electrolytic cell 40 having electrodes 41 and 42. In this cell I electrolyze any solution capable of yielding hydrogen and chlorine, such as a solution of sodium chloride or calcium chloride, collecting hydrogen at electrode 41 and chlorine at electrode 42. The collection device on the latter electrode is connected by a conduit 43 directly to the conduit 15 of the lower portion 3 of the furnace 1. The hydrogen from the hydrogen electrode 41 passes through a conduit 44 to the jacket 19 on the condenser 18. Hydrogen recovered in the initial water condenser 11 is conducted to the conduit 44 by means of a conduit 45. The hot hydrogen from the jacket 19 of the condenser 18 passes, as hereinabove explained into the upper part 2 of the furnace 1. A branch conduit 46 connects the conduit 22 with the hydrogen inlet 31 on the furnace 27 and also with the inlet side of the dryer 35 adjacent that furnace.

Along with the vapors of ferrous and manganous chlorides passing from the lower portion 3 of the furnace, there will be some excess of hydrogen and hydrogen chloride gas. This excess is drawn off from the condenser 18 through a conduit 47 and passes to a condenser 48 wherein an aqueous solution of hydrogen chloride gas is condensed and delivered to the electrolytic cell 40 by a conduit 49. Hydrogen and hydrogen chloride gases not forming part of this solution are delivered from the condenser 48 through a conduit 50 and pump 51 to the electrolytic cell 40 in such a position that the hydrogen so introduced will be collected by the collection device surrounding electrode 41, while the hydrogen chloride will react with sodium or calcium hydroxides generated by the electrolysis in the cell. It will be understood that in all the conduits hereinabove mentioned pumps may be included as required. It will be understood, however, that the delivery of hydrogen and hydrogen chloride gas to the electrolytic cell is for the purpose of separating hydrogen from hydrogen chloride and dissociating the hydrogen chloride into hydrogen and chlorine so that the gases can be re-mixed in the proportions required to give the desired hydrogen to hydrogen chloride ratios at various points in the process. If all the hydrogen required in the process is generated by electrolysis, more chlorine will be produced than will be needed and must be removed from the system at some point on conduit 43. Where hydrogen is available from low cost sources, such as from natural gas, the excess hydrogen required can be supplied thereby, in which case it will be necessary to generate less hydrogen electrolytically and only enough chlorine to supply the demands of the system will be produced. Excess chlorine, if produced, can be drawn off for other uses at 54.

The mixture of hydrogen and hydrogen chloride gas from the condenser 48, augmented if desired by a supply of the same gases from the furnace 27 delivered through a conduit 53, is conducted by a conduit 52 to the inlet 14, for these gases at the bottom of the lower furnace section 3. All conduits shown in the diagram may be valved as desired. Other connections are possible as will be evident.

The condenser 18 will be operated at such temperature as to condense ferrous and manganous chlorides, but without condensation of materials for which treatment in the furnace 27 is not desired. Thus, where the ores or slag contain arsenic or other materials having lower boiling chlorides than ferrous chloride and manganous chlorides, these substances will be drawn off through the conduit 47 and condensed in the condenser 48. If the ores or slags contain any large quantity of such substances, they will gradually contaminate the electrolyte in the cell 40; but this electrolyte may easily and cheaply be replaced. Phosphorus will also accumulate in the electrolyte in the cell 40, and the recovery of by-products from spent electrolyte can be practiced without departing from the spirit of my invention.

If the ores or slags contain elements which either do not form chlorides under the conditions hereinabove described or form chlorides having substantially higher boiling points than the temperatures set forth, these elements will go out of the furnace 1 with the gangue, and can be recovered therefrom by other methods if economical.

While I have shown the portions 2 and 3 of the furnace 1 as part of a unitary furnace structure, it will be understood that they may be divided and separated if desired and also that a gate apparatus may be employed between the two sections to minimize diffusion of gases. Also, means other than those specifically described may be employed for introducing the dry comminuted slag or ore into the furnace sections and withdrawing the gangue therefrom.

Modifications may be made in my invention without departing from the spirit of it. Having thus described my invention in an exemplary embodiment, what I claim as new and desire to secure by Letters Patent is:

1. A process for the purpose described comprising the steps of contacting manganese- and iron-containing ores or slags with reducing gas and reducing iron-containing substances therein to elemental iron, and manganese-containing substances therein to manganous oxide, contacting the so-treated material with an atmosphere comprising a mixture of hydrogen and hydrogen chloride gas and converting the said elemental iron and manganous oxide therein to ferrous and manganous chlorides, the said hydrogen in said atmosphere being maintained in excess of that produced in the formation of the said chlorides, the said reactions being carried on at temperatures at which the said chlorides are in the vapor phase, separating the said chloride vapors from the treated ores or slags, and condensing the said vapors to recover ferrous and manganous chlorides in solid form.

2. The process claimed in claim 1 wherein the reduction of iron-containing substances to iron, and manganese-containing substances to manganous oxide is accomplished by the use of hydrogen at temperatures ranging substantially between 700° F. and 2000° F.

3. The process claimed in claim 2 wherein gases from the reduction step are passed into a condenser so as to condense water therefrom, remaining hydrogen in said gases being returned to the system for further use as a reducing agent.

4. The process claimed in claim 1 including the steps of contacting the said solid ferrous and manganous chlorides with a hydrogen-bearing atmosphere at temperatures lying substantially between 700° F. and 1600° F. and having such water content that the said atmosphere is reducing toward iron and oxidizing toward manganese, for a sufficient time to convert the ferrous chloride to elemental iron and the manganous chloride to manganous oxide, and separating the said elemental iron and manganous oxide.

5. The process claimed in claim 4 in which the mixture of hydrogen and hydrogen chloride gas resulting from the recited conversion of ferrous and manganous chlorides to elemental iron and manganous oxide is returned to the previously recited step of converting elemental iron and manganous oxide to ferrous and manganous chlorides.

6. The process claimed in claim 5 including the step of continuously generating hydrogen and chlorine in an electrolytic cell, separately collecting the said gases, delivering the hydrogen so generated to the aforementioned first and last conversion steps, and mixing the generated chlorine with hydrogen in excess so as to form a mixture of hydrogen and hydrogen chloride gas for use in the second conversion step of the said process.

7. The process claimed in claim 5 including the step of withdrawing uncondensed gaseous products from the said step of condensing ferrous and manganous chlorides, freeing them of water at a lower temperature whereby to recover a mixture of hydrogen and hydrogen chloride gases and returning said mixture to the said second conversion step.

8. The process claimed in claim 5 wherein the said vapors of ferrous and manganous chlorides are condensed by bringing them into heat exchange relationship with a hydrogen-bearing atmosphere whereby the said hydrogen-bearing atmosphere is heated for use in the first step of the said process.

9. The process claimed in claim 5 wherein a portion at least of the hydrogen chloride gas employed in the step of converting elemental iron and manganous oxide to chlorides is formed in the said step by the combustion of hydrogen and chlorine in the presence of the said materials.

10. In apparatus for the purpose described, a first furnace section, means for introducing into said section ore or slag materials containing iron and manganese compounds and heating them therein, means for introducing a hydrogen-bearing atmosphere so as to subject the said materials to reducing conditions, a second furnace section, means for delivery of the said materials from the first furnace section to the second furnace section, means substantially isolating the said furnace sections atmospherically, means for heating the materials in the second furnace section, means for introducing into the second furnace section an atmosphere comprising hydrogen and hydrogen chloride gas whereby to convert the iron and manganese values in said materials to ferrous and manganous chlorides in the vapor phase, a condenser, a connection between said condenser and said second furnace section for the delivery of the said chloride vapors to said condenser, means for bringing a hydrogen-bearing atmosphere into heat exchange relationship with the said vapors whereby to condense the said vapors to solid ferrous and manganous chlorides and whereby to heat the said hydrogen-bearing atmosphere, a connection between the said heat exchange means and the means for introducing a hydrogen-bearing atmosphere into the said first furnace section, a third furnace section, means for delivering the said solid ferrous and manganous chlorides to the said third furnace section, means for heating the said chlorides therein and means for introducing into the said third furnace section a hydrogen-bearing atmosphere reducing to iron and oxidizing to manganese whereby to convert the said chlorides respectively to elemental iron and manganous oxide and the said atmosphere to a mixture of hydrogen and hydrogen chloride gas, and means for returning the said converted atmosphere to the said second furnace section.

11. Apparatus as claimed in claim 10 including means for drying and returning a hydrogen-bearing atmosphere exiting from said first furnace section, means for returning to said second furnace section the mixture of hydrogen and hydrogen chloride gases exiting from said condenser, an electrolytic cell including means for separately generating hydrogen and chlorine, means for introducing the hydrogen so generated into the heat exchange means of said condenser and into said third furnace section, and means for introducing the chlorine so generated into the said second furnace section.

12. In a process of separating manganese and iron values from a mixture of the chlorides of the two metals, the steps of contacting the said chloride mixture with a hydrogen-bearing atmosphere at temperatures lying substantially between 700° F. and 1600° F. and having such water content that the said atmosphere is reducing toward iron and oxidizing toward manganese, for a sufficient time to convert the iron chloride to elemental iron and the manganese chloride to manganese oxide, and separating the said elemental iron and manganese oxide magnetically.

13. In a process of recovering and separating iron and manganese values from ore or slag containing them, the steps of chloridizing the ore or slag under conditions of heat to volatilize the chlorides of said metals, condensing the chlorides so formed as a mixture of solid ferrous and manganous chlorides, contacting the chloride mixture with a hydrogen-bearing atmosphere at temperatures lying substantially between 700° and 1600° F. and having such water content that the said atmosphere is reducing toward iron and oxidizing toward manganese, for a sufficient time to convert the ferrous chloride to elemental iron and the manganous chloride to manganese oxide, both in particulate form, and separating the said elemental iron and manganous oxide magnetically.

14. In a process for recovering manganese and iron values from ores or slags containing them which comprises the steps of contacting the said ores or slags with an atmosphere comprising a mixture of hydrogen and hydrogen chloride gas whereby to convert the said iron and manganese values to ferrous and manganous chlorides, the said hydrogen in said atmosphere being maintained in excess of that produced in the formation of the said chlorides whereby to maintain during the said reaction conditions reducing both to iron and to manganese, the said reaction being carried on at temperatures at which the said chlorides are in the vapor phase, separating the said chloride vapors from the treated ores or slags, and condensing the said vapors to recover ferrous and manganous chlorides in solid form.

15. The process claimed in claim 1 wherein gases from the reduction step are passed into a condenser so as to condense water therefrom, remaining reducing gas being returned to the system for further use as a reducing agent.

16. The process claimed in claim 13 in which a mixture of hydrogen and hydrogen chloride gas resulting from the recited conversion of ferrous and manganous chlorides to elemental iron and manganous oxide is returned to the previously recited step of chloridizing the ore or slag.

17. The process claimed in claim 13 wherein the chloridizing of the ore or slag is accomplished by the use of hydrogen and hydrogen chloride gases, the hydrogen being maintained in excess of that produced in the formation of the said chlorides whereby to maintain conditions during the said chloridizing reducing both to iron and to manganese.

References Cited in the file of this patent

UNITED STATES PATENTS

| Number | Name | Date |
|---|---|---|
| 1,310,724 | Westberg | July 22, 1919 |
| 1,433,854 | Sinding-Larsen | Oct. 31, 1922 |
| 1,901,102 | Holt et al. | Mar. 14, 1933 |
| 1,908,645 | Fowler | May 9, 1933 |
| 1,951,342 | Bradley | Mar. 20, 1934 |
| 2,074,013 | Bradley | Mar. 16, 1937 |
| 2,199,654 | Simpson | May 7, 1940 |
| 2,236,474 | Hardy | Mar. 25, 1941 |
| 2,290,843 | Kinney | July 21, 1942 |
| 2,339,793 | Moeklebust et al. | Jan. 25, 1944 |
| 2,381,023 | Wulff | Aug. 7, 1945 |
| 2,509,921 | Gwynn | May 30, 1950 |
| 2,545,932 | Tiddy et al. | Mar. 30, 1951 |

OTHER REFERENCES

"A Comprehensive Treatise on Inorganic and Theoretical Chemistry," by Mellor, vol. 14, published by Longmans, Green & Co., 1935, page 11.